United States Patent
Seto

(10) Patent No.: US 9,238,420 B2
(45) Date of Patent: Jan. 19, 2016

(54) SEAT LOCK APPARATUS

(71) Applicant: Mitsui Kinzoku Act Corporation, Yokohama-shi, Kanagawa (JP)

(72) Inventor: Naoya Seto, Yokohama (JP)

(73) Assignee: MITSUI KINZOKU ACT CORPORATION, Yokohama-shi (JP)

( * ) Notice: Subject to any disclaimer, the term of this patent is extended or adjusted under 35 U.S.C. 154(b) by 198 days.

(21) Appl. No.: 14/065,772

(22) Filed: Oct. 29, 2013

(65) Prior Publication Data

US 2014/0117698 A1 May 1, 2014

(30) Foreign Application Priority Data

Oct. 31, 2012 (JP) .................................. 2012-241040

(51) Int. Cl.
*B60N 2/015* (2006.01)
*B60N 2/36* (2006.01)
*B60N 2/22* (2006.01)

(52) U.S. Cl.
CPC ............ *B60N 2/01583* (2013.01); *B60N 2/366* (2013.01); *B60N 2/2245* (2013.01)

(58) Field of Classification Search
CPC .. B60N 2/2245; B60N 2/01583; B60N 2/366; B60N 2/305
USPC .................... 297/378.12, 378.13, 336, 463.1; 296/65.01, 65.03; 292/216
See application file for complete search history.

(56) References Cited

U.S. PATENT DOCUMENTS

| 6,152,515 | A | 11/2000 | Wieclawski | |
|---|---|---|---|---|
| 8,511,723 | B2 * | 8/2013 | Otsuka | 292/216 |
| 8,882,160 | B2 * | 11/2014 | Kamata et al. | 292/216 |
| 2005/0062326 | A1 | 3/2005 | Kim et al. | |
| 2005/0104384 | A1 | 5/2005 | Kondo et al. | |
| 2009/0056393 | A1 | 3/2009 | Otsuka | |
| 2013/0259565 | A1 * | 10/2013 | Hanaki et al. | 403/376 |
| 2013/0328372 | A1 * | 12/2013 | Suzumura et al. | 297/378.13 |

FOREIGN PATENT DOCUMENTS

| CN | 1613684 A | 5/2005 |
|---|---|---|
| CN | 101133224 A | 2/2008 |
| CN | 101357607 A | 2/2009 |

(Continued)

OTHER PUBLICATIONS

Search report dated May 1, 2014 issued in connection with Great Britain Application No. 1319189.5.

(Continued)

*Primary Examiner* — Milton Nelson, Jr.
(74) *Attorney, Agent, or Firm* — Foley & Lardner LLP

(57) ABSTRACT

A seat lock apparatus includes a guide lever having a waiting hook engagement portion and a striker abutment portion and a hook having a guide engagement portion which, when the hook reaches a waiting position which lies further in a striker releasing direction than a striker releasing position, engages with the waiting hook engagement portion to hold the hook in the waiting position and is disengaged from the waiting hook engagement portion so that the hook restrains the striker. The guide lever has a halfway hook engagement portion which, when the hook is in a halfway position between the releasing position and a restraining position and the striker is not in a position to be restrained by the hook, engages with the guide engagement portion to hold the hook in the halfway position.

8 Claims, 12 Drawing Sheets

(56) References Cited

FOREIGN PATENT DOCUMENTS

| | | |
|---|---|---|
| JP | 2003-135189 | 5/2003 |
| JP | 3908506 B2 | 4/2007 |
| JP | 2007-196718 A | 8/2007 |
| JP | 2009-057039 A | 3/2009 |
| JP | 2012-106676 A | 6/2012 |
| WO | WO-2013/021679 | 2/2013 |

OTHER PUBLICATIONS

Notification of First Office Action dated Sep. 1, 2015 issued in Chinese Application No. 201310533040.8, with English translation.

* cited by examiner

SEAT LOCK APPARATUS

This application claims priority from Japanese Patent Application No. 2012-241040 filed on Oct. 31, 2012, the entire subject-matter of which is incorporated herein by reference.

BACKGROUND OF THE INVENTION

1. Field of the Invention

The present invention relates to a seat lock apparatus.

2. Description of the Related Art

In seat lock apparatuses used to fix a seat to a vehicle body, there has been proposed an apparatus including a body, a hook and a guide lever (for example, refer to Japanese Patent No. 3908506).

The body is a case member having a substantially recessed shape configured to accommodate the hook and the guide lever. The body has a striker entering groove which a striker provided on either the vehicle body or the seat enters. The hook engages with the striker that has entered the striker entering groove to restrain the striker. The hook is supported by the body in such a way as to move from a restraining position where the hook restrains the striker in a striker releasing direction for releasing the striker. Also, the hook is biased in a direction opposite to the striker releasing direction by a spring. The guide lever is configured to hold the hook which has moved in the striker releasing direction in a waiting position. The guide lever includes a hook engagement portion, which is configured to engage with a guide engagement portion provided to the hook, and a striker abutment portion configured to abut with the striker. The guide lever is supported by the body in such a way as to move from an engagement position, in which the hook engagement portion is in engagement with the guide engagement portion of the hook, in a disengaging direction for canceling the engagement. Also, the guide lever is biased in a direction opposite to the disengaging direction by a spring.

In a seat lock apparatus of this type, the waiting position for the hook is set to a position which is situated further in the striker releasing direction than a striker releasing position where to release the striker. Further, the guide lever is made to move in the disengaging direction when the striker abutment portion is pushed in a direction toward a deepest portion of the striker entering groove. Therefore, the engagement of the guide engagement portion of the hook with the hook engagement portion of the guide lever is cancelled when the striker that has entered the striker entering groove presses on the striker abutment portion, whereby the hook is moved to the restraining position to restrain the striker. On the other hand, when the hook staying in the restraining position is moved to the waiting position, the hook is held in the waiting position.

In the above-described related-art seat lock apparatus, the striker does not have to move the hook in the striker releasing direction when restraining the striker, and therefore, it is possible to restrain the striker with a light operation force. Further, when the striker is released, the striker abutment portion of the guide lever presses on the striker. Therefore, it is possible to allow the striker to depart from the striker entering groove with a light operation force.

SUMMARY OF THE INVENTION

In the above-described related-art seat lock apparatus, when the hook is moved from the restraining position to the waiting position, the striker can be released before the hook reaches the waiting position. This may result in a situation in which the striker departs from the striker entering groove before the hook reaches the waiting position. Further, when the hook is stopped from moving before it reaches the waiting position, the hook returns to the restraining position. As a result, in the above-described related-art seat lock apparatus, there can be a situation in which the striker is not restrained irrespective of the fact that the hook is in the restraining position. In the above-described related-art seat lock apparatus, in order to prevent the occurrence of such a situation, for example, the spring force of the spring for biasing the hook is increased, so that the hook is allowed to return toward the restraining position faster than the department of the striker from the striker entering groove in the event that the hook is stopped from moving before it reaches the waiting position.

However, in the case where the spring force of the spring for biasing the hook is increased, a large force is required to move the hook from the restraining position to the waiting position. This requires a heavy operation force to release the striker.

Therefore, illustrative aspects of the invention provide a seat lock apparatus that enables the release of the striker with a light operation force and which can prevent the occurrence of the situation in which the striker is not restrained irrespective of the fact that the hook is in the restraining position.

According to one illustrative aspect of the invention, there is provided a seat lock apparatus comprising: a body having a striker entering groove configured to receive a striker; a hook that is supported by the body so as to be movable from a restraining position, in which the hook is brought into engagement with the striker having been entered the striker entering groove to restrain the striker, in a striker releasing direction for releasing the striker, wherein the hook is biased in a direction opposite to the striker releasing direction by a spring; and a guide lever that is supported by the body so as to be movable from an engagement position, in which the guide lever is brought into engagement with the hook having been moved in the striker releasing direction to hold the position of the hook, in a disengaging direction for being disengaged from the hook, wherein the guide lever is biased in a direction opposite to the disengaging direction by the spring, wherein the guide lever comprises: a hook engagement portion configured to be brought into engagement with a guide engagement portion provided to the hook; and a striker abutment portion configured to be brought into abutment with the striker, wherein the hook and the guide lever are configured such that: when the hook reaches a waiting position which lies further in the striker releasing direction than a releasing position for allowing the striker to be released, the guide lever moves to an engagement position, in which the guide engagement portion of the hook and the hook engagement portion of the guide lever are brought into engagement with each other so as to hold the hook in the waiting position; and when the striker abutment portion of the guide lever is pressed by the striker, the guide lever moves in the disengaging direction to cancel the engagement of the guide engagement portion of the hook with the hook engagement portion of the guide lever so as to enable the hook to restrain the striker and to make the guide lever to be held at a position where the guide lever reaches after the guide lever has moved in the disengaging direction, and wherein the guide lever comprises a halfway hook engagement portion configured to, when the hook is in a halfway position lying between the releasing position and the restraining position and the striker is not in a position where the striker can be restrained by the hook, bring into engagement with the guide engagement portion of the hook so as to hold the hook in the halfway position.

According to a second illustrative aspect of the invention, in the seat lock apparatus according to the first illustrative aspect, wherein the halfway hook engagement portion of the guide lever is configured to be brought into engagement with the guide engagement portion of the hook in such a way as to permit the movement of the hook in the striker releasing direction.

According to a third illustrative aspect of the invention, in the seat lock apparatus according to the first or the second illustrative aspect, wherein when the hook is held in the halfway position, a distance between the hook and the striker abutment portion of the guide lever is shorter than a diameter of the striker.

According to a fourth illustrative aspect of the invention, in the seat lock apparatus according to any one of the first to third illustrative aspects, wherein the hook comprises a restraining portion which moves across the striker entering groove between the striker and an entrance to the striker entering groove and is configured to restrain the striker, and wherein the restraining portion comprises an inclined surface on a surface facing the entrance to the striker entering groove, the inclined surface being inclined such that a distance from the entrance to the striker entering groove when the hook is held in the halfway position becomes longer as the inclined surface extends toward a distal end portion thereof.

According to a fifth illustrative aspect of the invention, in the seat lock apparatus according to any one of the first to fourth illustrative aspects, wherein the hook is rotatably supported by a hook shaft provided in the body, wherein the hook shaft is provided to the body such that the hook shaft is rotatable, and wherein the body is rotatably supported by a support member in such a way that an opening position of the striker entering groove is changed via the hook shaft.

According to a sixth illustrative aspect of the invention, the seat lock apparatus according to any one of the first to fourth illustrative aspects further comprises: an opening lever that is supported in the body in such a way as to move the hook in the striker releasing direction, wherein the opening lever is biased by a spring in a direction opposite to the direction in which the hook is moved in the striker releasing direction, wherein the hook is rotatably supported by a hook shaft provided in the body, wherein the hook comprises: the guide engagement portion at a first side of the hook shaft; and an indicator engagement portion at a second side of the hook shaft, the indicator engagement portion being configured to be brought into engagement with the opening lever to hold the position of the opening lever to the second side of the hook shaft, and wherein the opening lever comprises: a canceling portion configured to press on the indicator engagement portion of the hook to move the hook in the striker releasing direction; and an indicator portion configured to be brought into engagement with the indicator engagement portion of the hook when being moved in a biased direction.

According to a seventh illustrative aspect of the invention, in the seat lock apparatus according to the sixth illustrative aspect, wherein the indicator portion of the opening lever and the indicator engagement portion of the hook are configured such that a position where the opening lever is held when the hook is in the restraining position differs from a position where the opening lever is held when the hook is in a position other than the restraining position.

According to an eighth illustrative aspect of the invention, in the seat lock apparatus according to the sixth or seventh illustrative aspect, wherein the hook shaft is provided to the body such that the hook shaft is rotatable, and wherein the body is rotatably supported by a support member in such a way that an opening position of the striker entering groove is changed via the hook shaft.

In the seat lock apparatus according to the illustrative aspects of the invention, the waiting position where the hook is held is situate further in the striker releasing direction than the releasing position where the striker can be released. Therefore, in the event that the hook is stopped from moving in the striker releasing direction before the hook which has passed the releasing position reaches the waiting position, the hook moves toward the restraining position. As this occurs, when the striker is not in the position where the striker can be restrained by the hook, the guide engagement portion of the hook is brought into engagement with a halfway hook engagement portion of the guide lever, whereby the hook is held in the halfway position which lies between the releasing position and the restraining position. According thereto, it is possible to prevent the hook from reaching the restraining position in such a state that the striker is not in the position where the striker can be restrained by the hook. Therefore, the hook is prevented from moving to the restraining position in such a state that the striker is not in the position where the striker can be restrained by the hook without increasing the spring force of the spring which biases the hook. Namely, with the seat lock apparatus according to the invention, the striker can be released with a light operation force, and it is possible to prevent the occurrence of a situation in which the striker is not restrained irrespective of the fact that the hook is in the restraining position.

DETAILED DESCRIPTION

Figure 1:
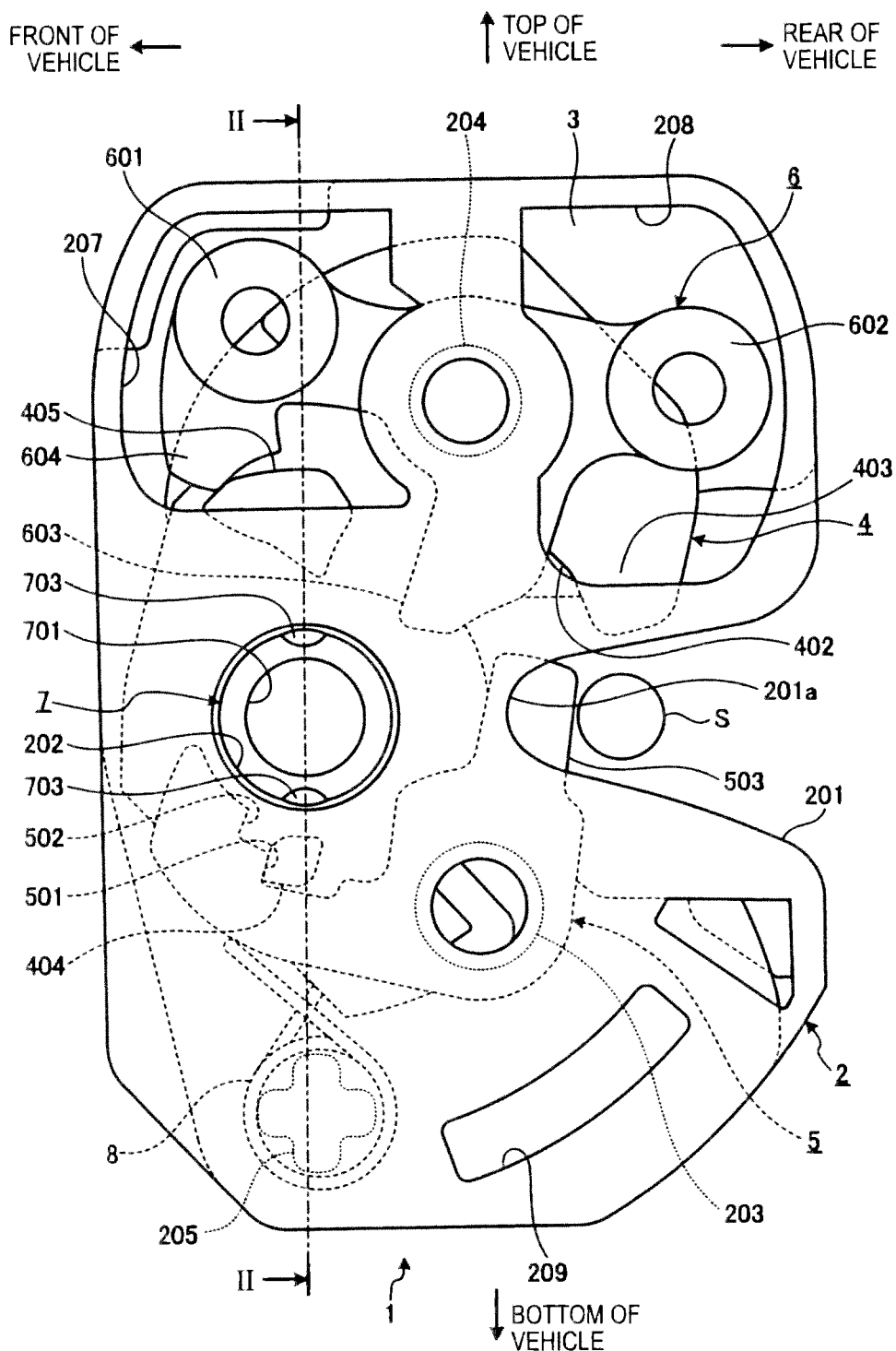
FIG. 1 is a plan view showing a schematic configuration of a seat lock apparatus according to an exemplary embodiment of the invention.

Hereinafter, exemplary embodiments of the invention will be described in detail with reference to the drawings. Incidentally, in the description and the drawings, parts or members having the same function will be given the same reference numerals and repetition of the same description will be omitted.

Figure 2:
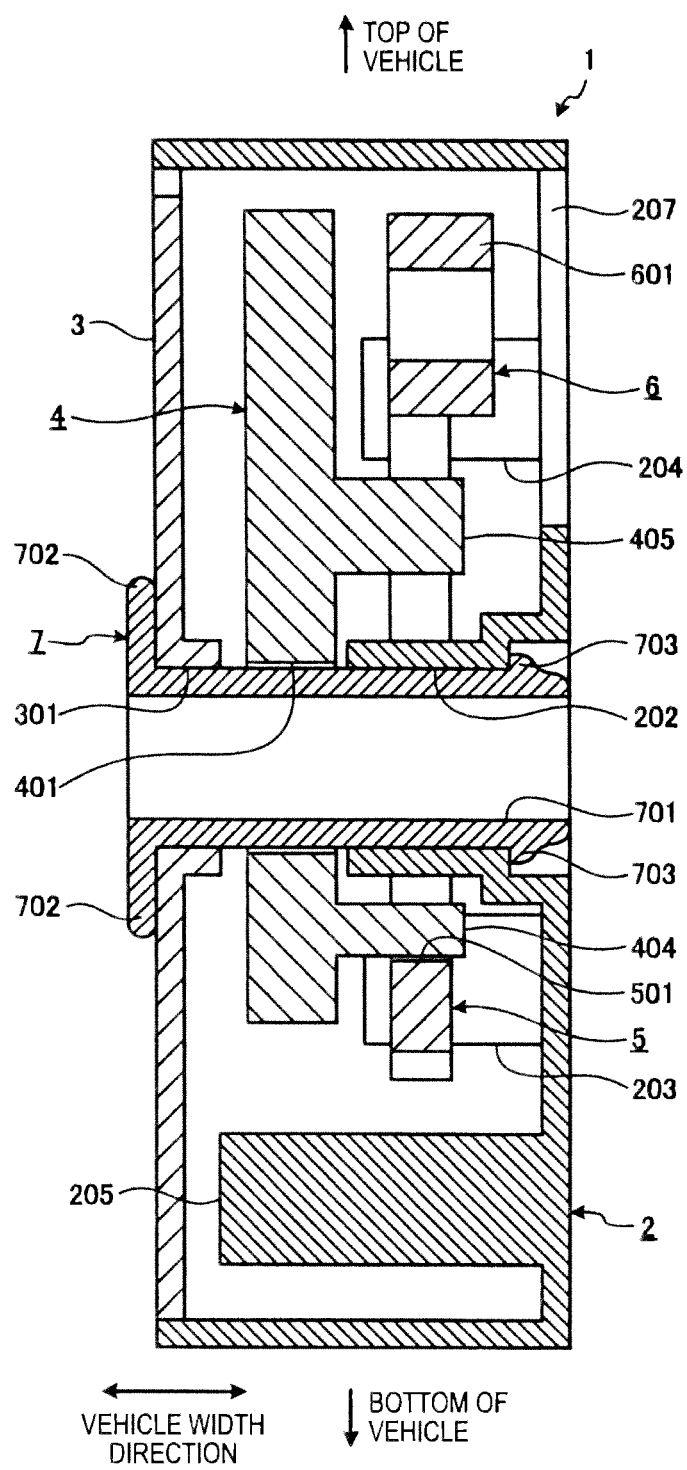
FIG. 2 is a sectional view of the seat lock apparatus taken along the line II-II in FIG. 1.

FIG. 1 is a plan view showing a schematic configuration of a seat lock apparatus according to an exemplary embodiment of the invention. FIG. 2 is a sectional view of the seat lock apparatus taken along the line in FIG. 1.

The seat lock apparatus of this exemplary embodiment is used to fix a seat to a vehicle body and is mounted on either the vehicle body or the seat. This exemplary embodiment will be described as the seat lock apparatus being mounted in a backrest of the seat.

As shown in FIGS. 1 and 2, the seat lock apparatus 1 includes a body 2, a base plate 3, a hook 4, a guide lever 5, an opening lever 6, a hook shaft 7, and a coil spring 8. It should be noted that such words shown in FIGS. 1 and 2 as top of vehicle, bottom of vehicle, front of vehicle, rear of vehicle and vehicle width direction denote the orientation of the seat lock apparatus 1 with respect to the vehicle body when the seat lock apparatus 1 is mounted in the backrest of the seat.

The body 2 is configured to accommodate a lock mechanism which is made up of the hook 4, the guide lever 5, the opening lever 6 and the like. The body 2 is a case member having a substantially recessed shape and made from a synthetic resin. This body 2 has a striker entering groove 201 in a substantially central position in a top-to-bottom direction of a vehicle, and this striker entering groove 201 extends from a side of the body 2 which lies to face the rear of the vehicle toward a side of the body 2 which lies to face the front of the vehicle. The striker entering groove 201 has a width with which a striker S provided to the vehicle body can be accommodated therein, the width being gradually increased as the groove 201 extends from a deeper portion toward an entrance thereto. A deepest portion 201a of the striker entering groove 201 is formed into a curved surface which is concave toward the vehicle front side of the body 2 in order to reduce the loosening of the striker S restrained therein in the top-to-bottom direction of the vehicle.

Further, the body 2 includes a hook shaft insertion hole 202, a guide lever shaft 203, an opening lever shaft 204, and a spring support portion 205. The hook shaft insertion hole 202 is a hole through which the hook shaft 7 is inserted and rotatable and is provided further forwards toward the vehicle front side of the body 2 than the striker entering groove 201. The hook shaft 7 supports the hook 4 such that the hook is rotatable and functions as a rotating shaft of the seat lock apparatus 1 when the seat lock apparatus 1 is mounted on a support member (not shown) of the seat. The hook shaft 7 is formed into a cylinder having a through hole 701 which penetrates the hook shaft 7 in an axial direction thereof. The guide lever shaft 203 is a shaft which supports the guide lever 5 such that the guide lever 5 is rotatable and is provided in a position lying further downwards toward a vehicle bottom side of the body 2 than the striker entering groove 201. The opening lever shaft 204 is a shaft which supports the opening lever 6 such that the opening lever 6 is rotatable and is provided in a position lying further upwards toward a vehicle top side of the body 2 than the striker entering groove 201. The spring support portion 205 is a projecting portion which supports the coil spring 8 which biases the hook 4 and the guide lever 5 and is provided in a position which lies further downwards toward the vehicle bottom side of the body 2 than the hook shaft insertion hole 202 and which does not interfere with the hook 4 and the guide lever 5. The coil spring 8 is a spring which biases the hook 4 and the guide lever 5 in a clockwise direction in FIG. 1.

Further, the body 2 includes operation member connecting openings 207, 208 and a rotation restricting hole 209. The operation member connecting openings 207, 208 are openings where an operation member (not shown) such as an operation lever provided in the seat is connected with connecting portions 601, 602 of the opening lever 6. The rotation restricting hole 209 is an arc-shaped elongated hole formed around a rotating center (the center of the through hole 701 in the hook shaft 7 as seen in FIG. 1) of the seat lock apparatus 1 and is provided to restrict a rotational angular range of the seat lock apparatus 1 as will be described later.

The base plate 3 is a plate-shaped member formed of a metal or from a synthetic resin. The base plate 3 is attached to the body 2 so as to close an open surface provided in the body 2 for accommodating the hook 4, the guide lever 5, the opening lever 6 and the like. In this base plate 3, a round hole 301, which has the same dimension as that of the hook shaft insertion hole 202, is provided in a position which oppositely faces the hook shaft insertion hole 202 in the body 2, and the hook shaft 7 is inserted through the round hole 301 such that the hook shaft 7 is rotatable. The hook shaft 7 has a flange 702 at one end portion thereof. Further, a collapsed portion 703, which is deformed so as to project radially outwards, is formed at the other end portion of the hook shaft 7 so as to prevent the dislocation of the hook shaft 7 from the hook shaft insertion hole 202 and the round hole 301.

The hook 4 is intended to be brought into engagement with the striker S provided to the vehicle body to thereby restrain the striker S. The hook 4 is rotatably supported by the hook shaft 7 and is biased in the clockwise direction as shown in FIG. 1 by the coil spring 8. The hook 4 includes a shaft hole 401, an engagement surface 402, a restraining portion 403, a guide engagement portion 404 and an indicator engagement portion 405.

The shaft hole 401 is a hole through which the hook shaft 7 is inserted. The engagement surface 402 is a surface which is brought into engagement with the striker S when the striker S is restrained and is provided into a substantially arc shape which is centered at the shaft hole 401. The restraining portion 403 is a portion which restrains the striker S which is in engagement with the engagement surface 402 and prevents the striker S from departing from the striker entering groove 201. The guide engagement portion 404 is a projecting portion which can be brought into engagement with a waiting hook engagement portion 501 and a halfway hook engagement portion 502 of the guide lever 5, which are examples of a hook engagement portion and will be described later. The indicator engagement portion 405 is a projecting portion which can be brought into engagement with a canceling portion 603 and an indicator portion 604 of the opening lever 6, which will be described later. The guide engagement portion 404 is disposed to one side of the hook shaft 7 and the indicator engagement portion 405 is disposed to the other side of the hook shaft 7.

The guide lever 5 is intended to hold the hook 4 in a waiting position (a position shown in FIG. 1) or a halfway position. The guide lever 5 is rotatably supported by the guide lever shaft 203 and is biased in the clockwise direction as shown in FIG. 1 by the coil spring 8. The guide lever 5 includes a shaft hole (not shown), the waiting hook engagement portion 501, the halfway hook engagement portion 502 and a striker abutment portion 503.

The shaft hole is a hole through which the guide lever shaft 203 is inserted. The waiting hook engagement portion 501 is a portion intended to be brought into engagement with the guide engagement portion 404 of the hook 4 when the hook 4 is in the waiting position to thereby hold the hook 4 in the waiting position. The halfway hook engagement portion 502 is a portion intended to be brought into engagement with the guide engagement portion 404 of the hook 4 when the hook 4 is in a halfway position, which will be described later, to thereby hold the hook 4 in the halfway position. The striker abutment portion 503 is a portion intended to be brought into abutment with the striker S which enters the striker entering groove 201 and enters the striker entering groove 201 from the deepest portion 201a of the striker entering groove 201 when the waiting hook engagement portion 501 or the halfway hook engagement portion 502 is in engagement with the guide engagement portion 404.

The opening lever 6 is intended to move the hook 4 in a striker releasing direction (a counterclockwise direction as seen in FIG. 1) and functions as an indicator member which detects the position of the hook 4. The opening lever 6 is rotatably supported by the opening lever shaft 204 and is biased in the counterclockwise direction by the coil spring, not shown. The opening lever 6 includes a shaft hole (not shown), the connecting portions 601, 602, the canceling portion 603, and the indicator portion 604.

The shaft hole is a hole through which the opening lever shaft 204 is passed. The connecting portion 601, which is one of the connecting portions 601, 602, is a portion where a pull-rod (not shown) around which the opening lever 5 is rotated is mounted. The other connecting portion 602 is a portion where a pushrod (not shown) around which the opening lever 5 is rotated is mounted. The canceling portion 603 is a portion which presses on the indicator engagement portion 405 of the hook 4 to thereby move the hook in the striker releasing direction. The indicator portion 604 is a portion which projects from the connecting portion 601 toward the indicator engagement portion 405 of the hook 4 and is used to detect the position of the hook 4.

Next, referring to FIGS. 3 to 6, a basic operation of the seal lock apparatus 1 of the exemplary embodiment will be described.

Figure 3:
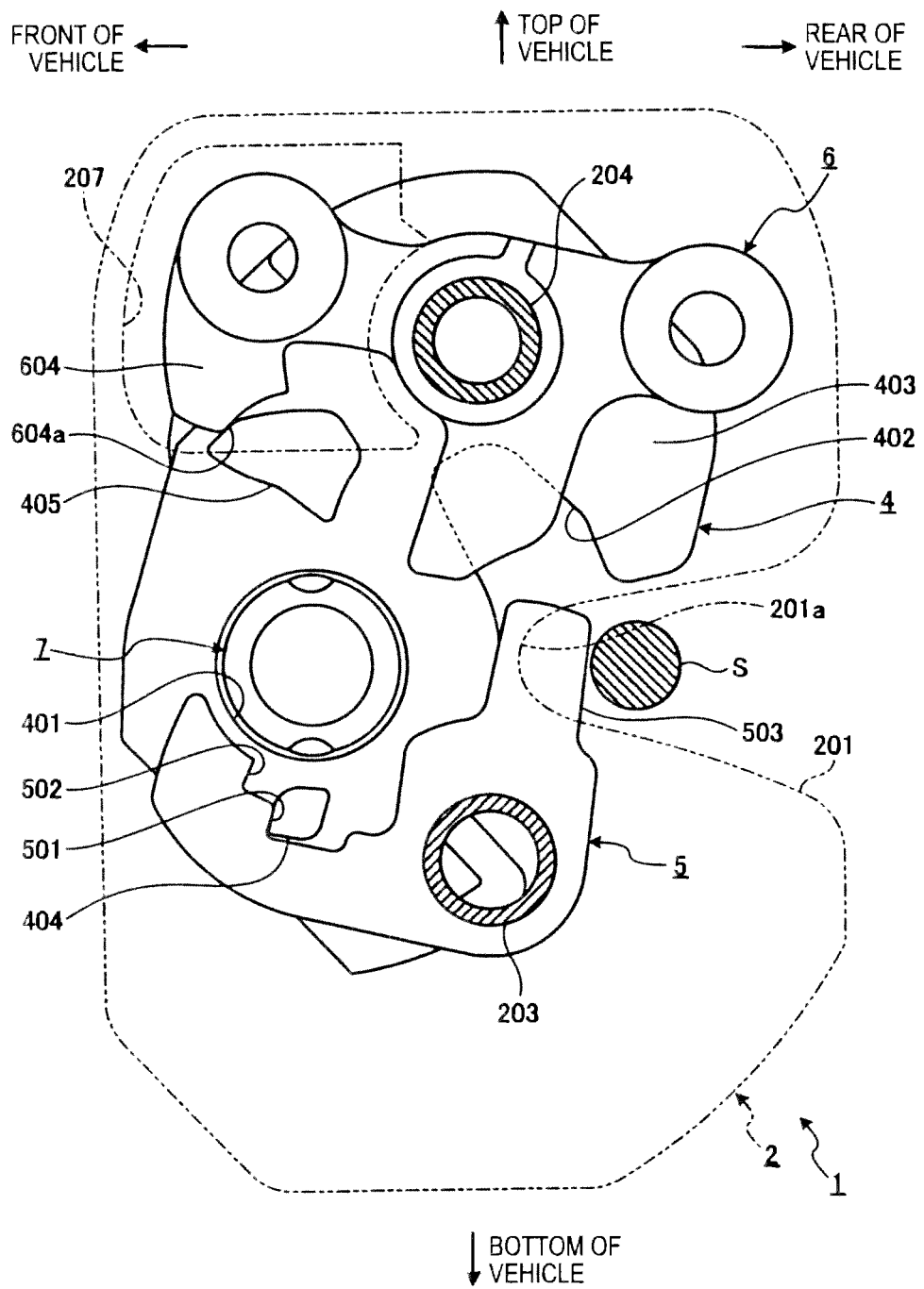
FIG. 3 is an exemplary diagram showing a positional relation between a hook, a guide lever and an opening lever when the hook is held in a waiting position.
Figure 4:
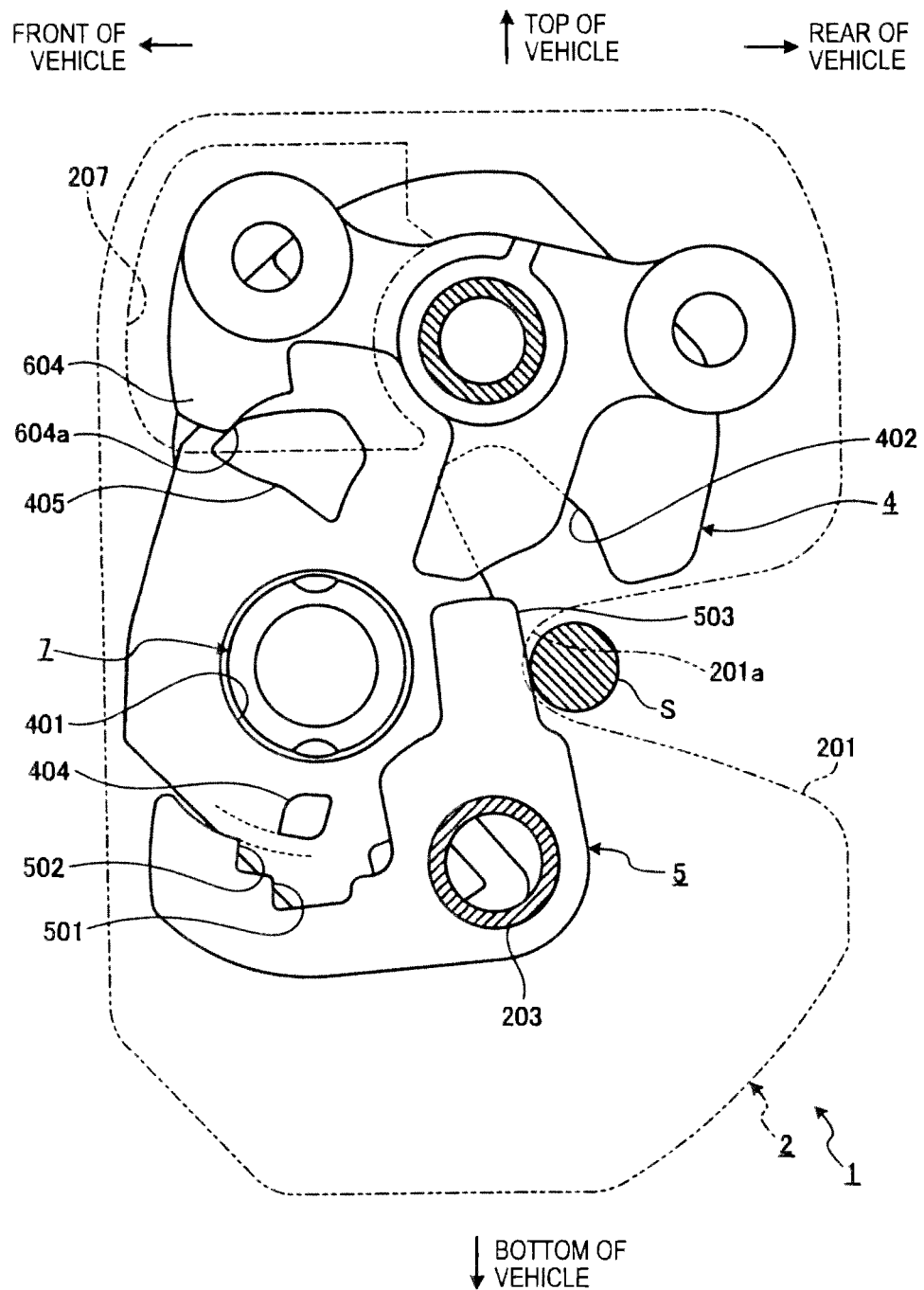
FIG. 4 is an exemplary diagram showing a positional relation between the hook, the guide lever and the opening lever when the engagement of the hook with the guide lever is cancelled.
Figure 5:
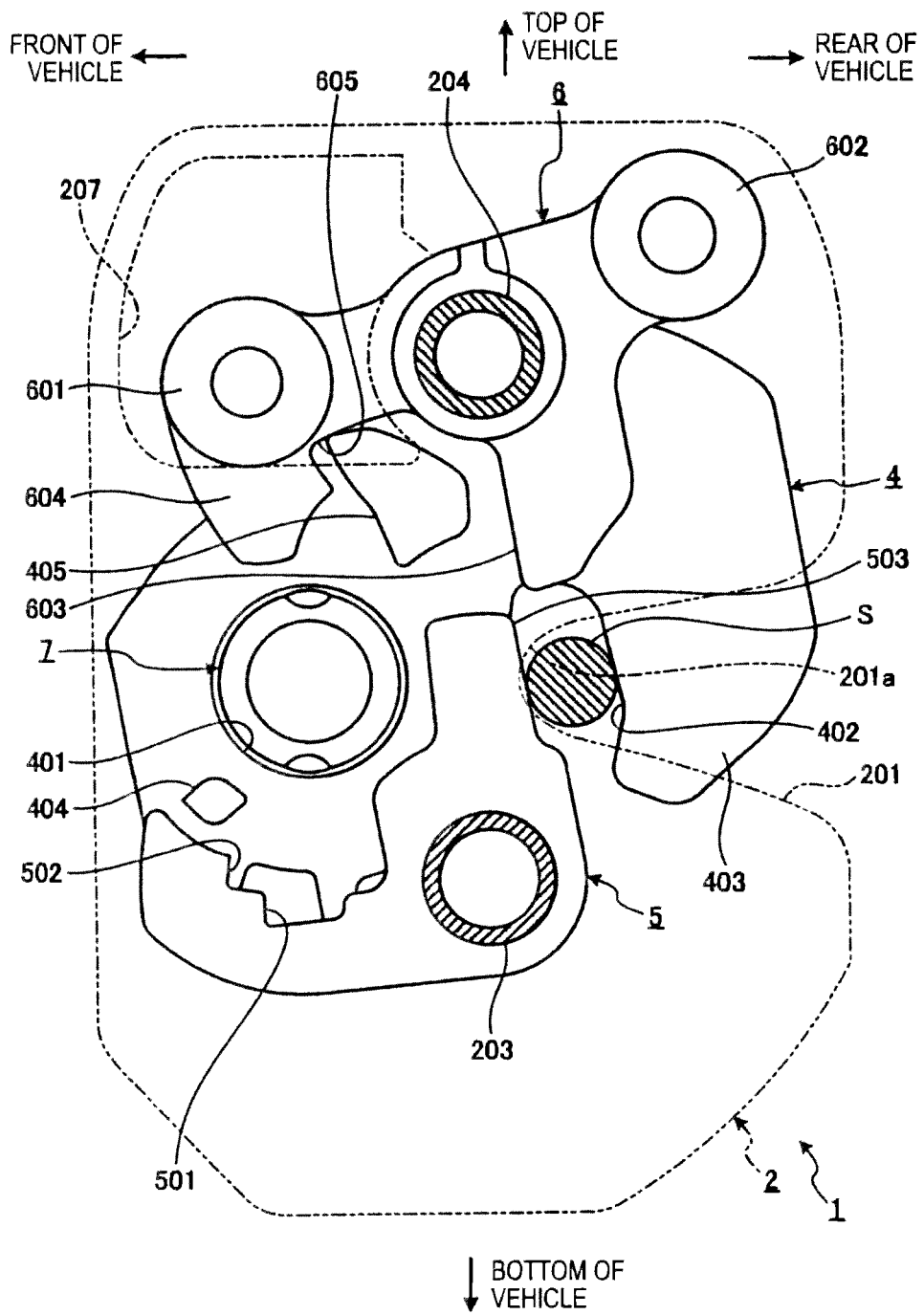
FIG. 5 is an exemplary diagram showing a positional relation between the hook, the guide lever and the opening lever when the hook has reached a restraining position.
Figure 6:
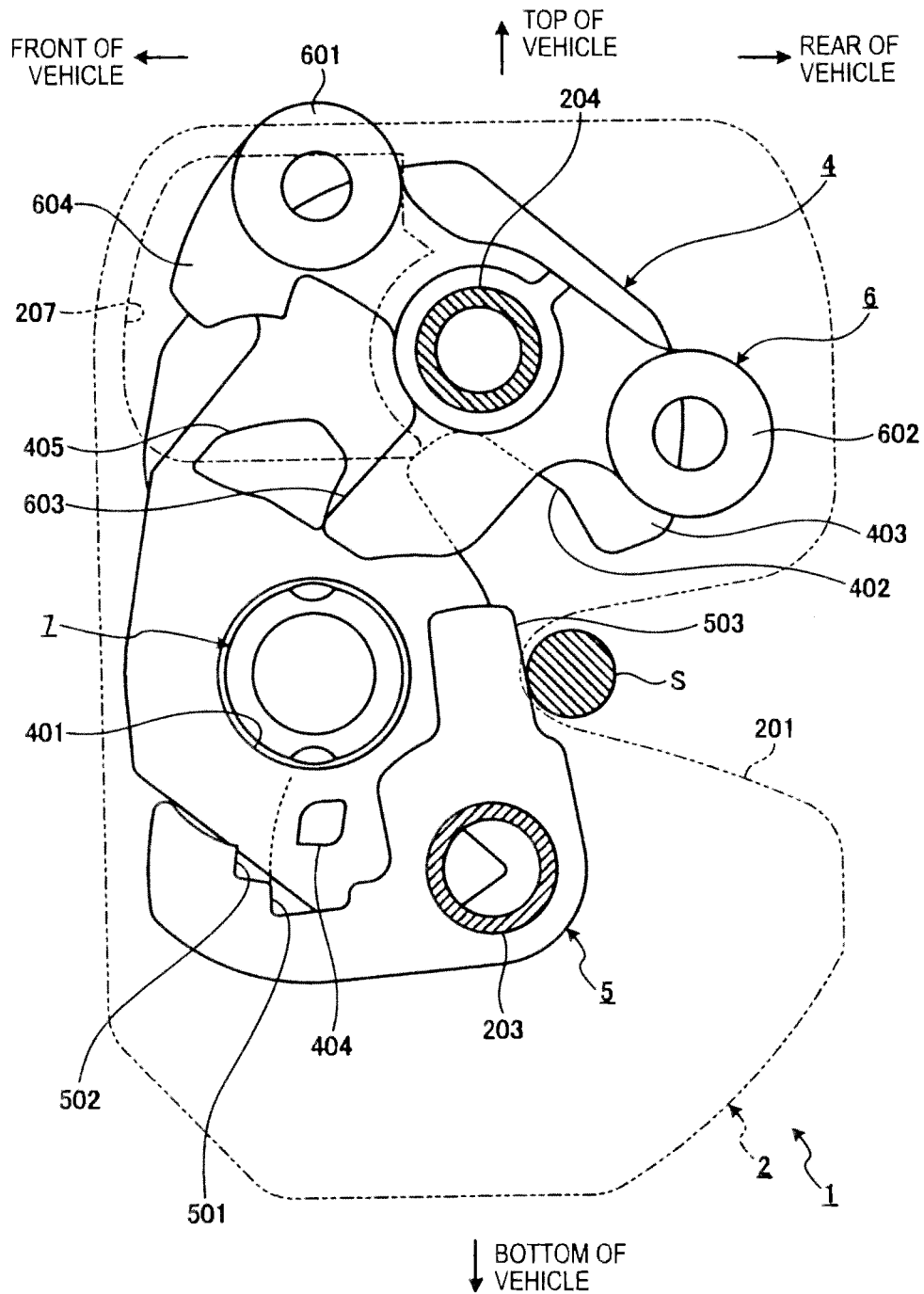
FIG. 6 is an exemplary diagram showing a positional relation between the hook, the guide lever and the opening lever when the hook is moved from the restraining position to the waiting position.

FIG. 3 is an exemplary diagram showing a positional relation between the hook, the guide lever and the opening lever when the hook is held in the waiting position. FIG. 4 is an exemplary diagram showing a positional relation between the hook, the guide lever and the opening lever when the engagement of the hook with the guide lever is cancelled. FIG. 5 is an exemplary diagram showing a positional relation between the hook, the guide lever and the opening lever when the hook has reached the restraining position. FIG. 6 is an exemplary diagram showing a positional relation between the hook, the guide lever and the opening lever when the hook is moved from the restraining position to the waiting position.

As has been described above, the seat lock apparatus 1 of this exemplary embodiment is mounted in the backrest of the seat. As this occurs, the striker S is provided to the vehicle body. When fixing the seat to the vehicle body, the striker S is caused to enter the striker entering groove 201 by moving the seat toward the rear of the vehicle in FIG. 1.

The hook 4, the guide lever 5 and the opening lever 6 are held individually in positions shown in FIG. 3 before the striker S enters the striker entering groove 201. The hook 4 is held in the waiting position where the restraining portion 403 has departed from the striker entering groove 201. The hook 4 held in the waiting position is biased in a clockwise direction as seen in FIG. 3 by the coil spring 8, and therefore, the hook 4 is held in the waiting position by bringing the waiting hook engagement portion 501 of the guide lever 5 into engagement with the guide engagement portion 404. In the guide lever 5, when the waiting hook engagement portion 501 is in an engagement position where the waiting hook engagement portion 501 is in engagement with the guide engagement portion 404, the striker abutment portion 503 enters the striker entering groove 201. The guide lever 5 is biased in the clockwise direction as seen in FIG. 3 by the coil spring 8, and therefore, the guide lever 5 is held in the engagement position unless an external force that moves the guide lever 5 in a counterclockwise direction (an engagement canceling or disengaging direction) as seen in FIG. 3 is exerted thereon. In the opening lever 6, a first engagement portion 604a of the indicator portion 604 is in engagement with the indicator engagement portion 405 of the hook 4. The opening lever 6 is biased in the counterclockwise direction as seen in FIG. 3, and therefore, the opening lever 6 is held in the engagement position where the first engagement portion 604a is in engagement with the indicator engagement portion 405 unless an external force that moves the opening lever 6 in the clockwise direction as seen in FIG. 3 is exerted thereon.

With the hook 4 held in the waiting position, when the striker S that enters the striker entering groove 201 is brought into abutment with the striker abutment portion 503 to thereby press thereon, the guide lever 5 moves in the disengaging direction in which the engagement of the waiting hook engagement portion 501 with the guide engagement portion 404 is cancelled or the former is disengaged from the latter. Then, when the striker S reaches a position where it can be restrained by the hook 4 (near the deepest portion 201a of the striker entering groove 201), as shown in FIG. 4, the guide lever 5 moves to a position where the waiting hook engagement portion 501 and the halfway hook engagement portion 502 are not in engagement with the guide engagement portion 404. Thus, the hook 4 moves in the biased direction (a clockwise direction as seen in FIG. 4), that is, to the restraining position where the hook 4 restrains the striker S. As the hook 4 moves in this way, as shown in FIG. 5, the engagement surface 402 of the hook 4 is brought into engagement with the striker S, and the restraining portion 403 moves to extend across the striker entering groove 201 to restrain the striker S. As this occurs, the guide lever 5 moves from the engagement position in the disengaging direction to thereby be held in place there. Since the guide lever 5 is biased in a clockwise direction as seen in FIG. 5 by the coil spring 8, the striker S is restrained in such a state that a pressing load is exerted thereon from the striker abutment portion 503 of the guide lever 5, thereby making it possible to prevent the loosening of the striker S.

In addition, when the hook 4 moves to the restraining position where the hook 4 restrains the striker S, the indicator engagement portion 405 also moves in an arc-like fashion, and therefore, the indicator engagement portion 405 is disengaged from the indicator portion 604 of the opening lever 6. Thus, the opening lever 6 moves in a counterclockwise direction by means of a biasing force exerted from a spring, not shown. As this occurs, an abutment portion 605 residing between the connecting portion 601 and the shaft hole is brought into abutment with the indicator engagement portion 405, whereby the opening lever 6 is held in a position which is different from the position where it is held when the hook 4 is in the waiting position.

On the other hand, when releasing the striker S, the opening lever 6 is moved in the clockwise direction as seen in FIG. 5. The opening lever 6 moves in the clockwise direction by pulling the pull-rod connected to the connecting portion 601 or pushing the pushrod connected to the connecting portion 602. When the opening lever 6 moves in the clockwise direction, the canceling portion 603 presses on the indicator engagement portion 405 of the hook 4. According thereto, as shown in FIG. 6, the hook 4 moves in the striker releasing direction, whereby the striker S is released. When the striker S is released, the guide lever 5 moves in the clockwise direction as seen in FIG. 6 by means of the biasing force exerted from the coil spring 8. When the guide lever 5 moves so, a pressing load is exerted on the striker S by the striker abutment portion 503, whereby the striker S is pushed out in a direction in which the striker S departs from the striker entering groove 201. Therefore, it is possible to cause the striker S to depart from the striker entering groove 201 with a light operation force.

Further, in the event that the hook 4, which has moved in the striker releasing direction, has reached the waiting position, the waiting hook engagement portion 501 is brought into engagement with the guide engagement portion 404 when the guide lever 5 rotates in the clockwise direction as seen in FIG. 6. Therefore, when the pulling operation of the pull-rod or the pushing operation of the pushrod is stopped in such a state that the hook 4 has reached the waiting position, the hook 4, the guide lever 5 and the opening lever 6 return to the positional relation shown in FIG. 3. As this occurs, the hook 4 is held in the waiting position which is situated further in the striker releasing direction than a striker releasing position where the striker S can be released, and the restraining portion 403 departs from the striker entering groove 201. Therefore, it is possible to cause the striker S released so to depart from the striker entering groove 201 in an ensured fashion.

Figure 7:
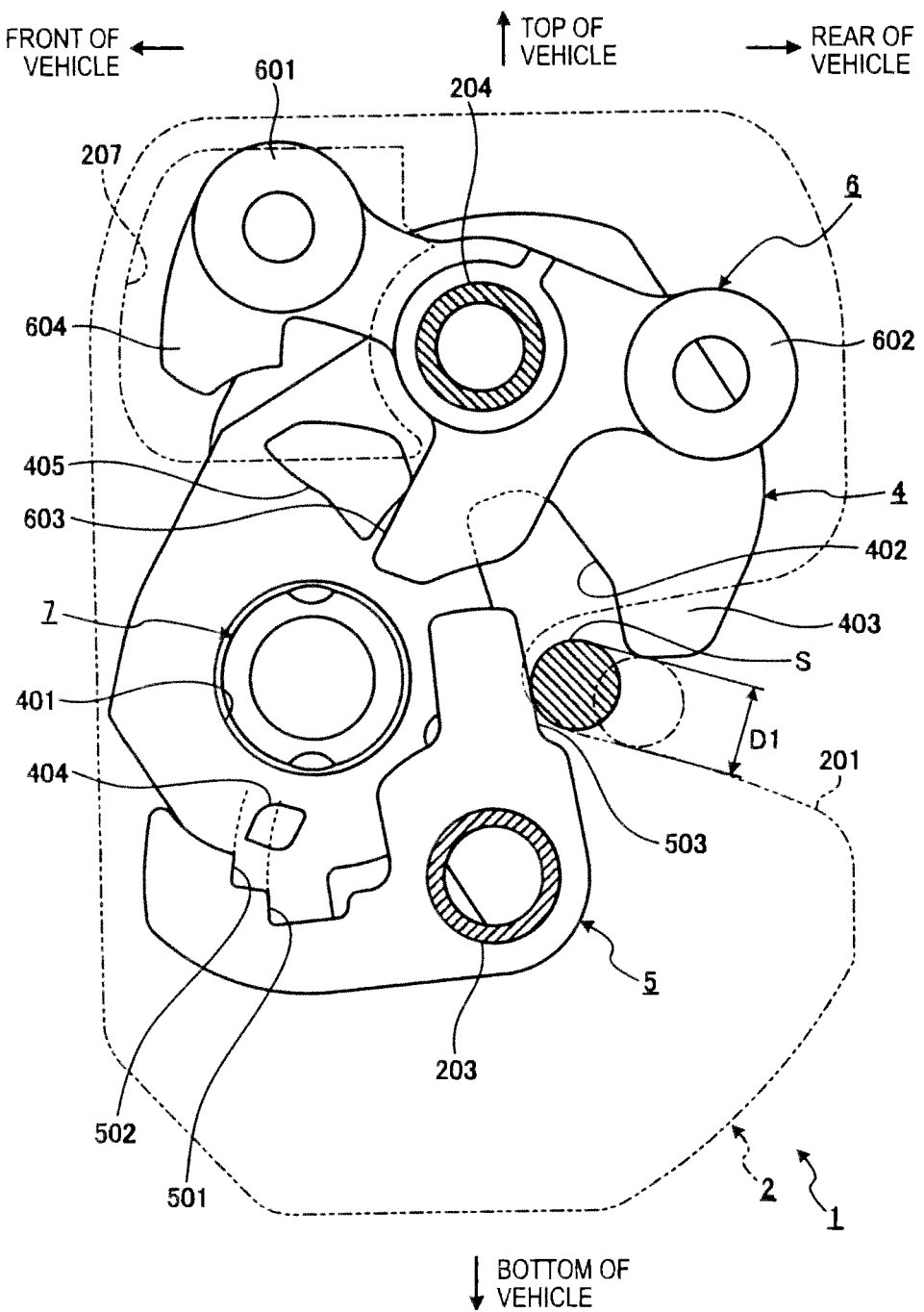
FIG. 7 is an exemplary diagram showing a positional relation between the hook, the guide lever and the opening lever at a point in time when the hook has reached a releasing position.
Figure 8:
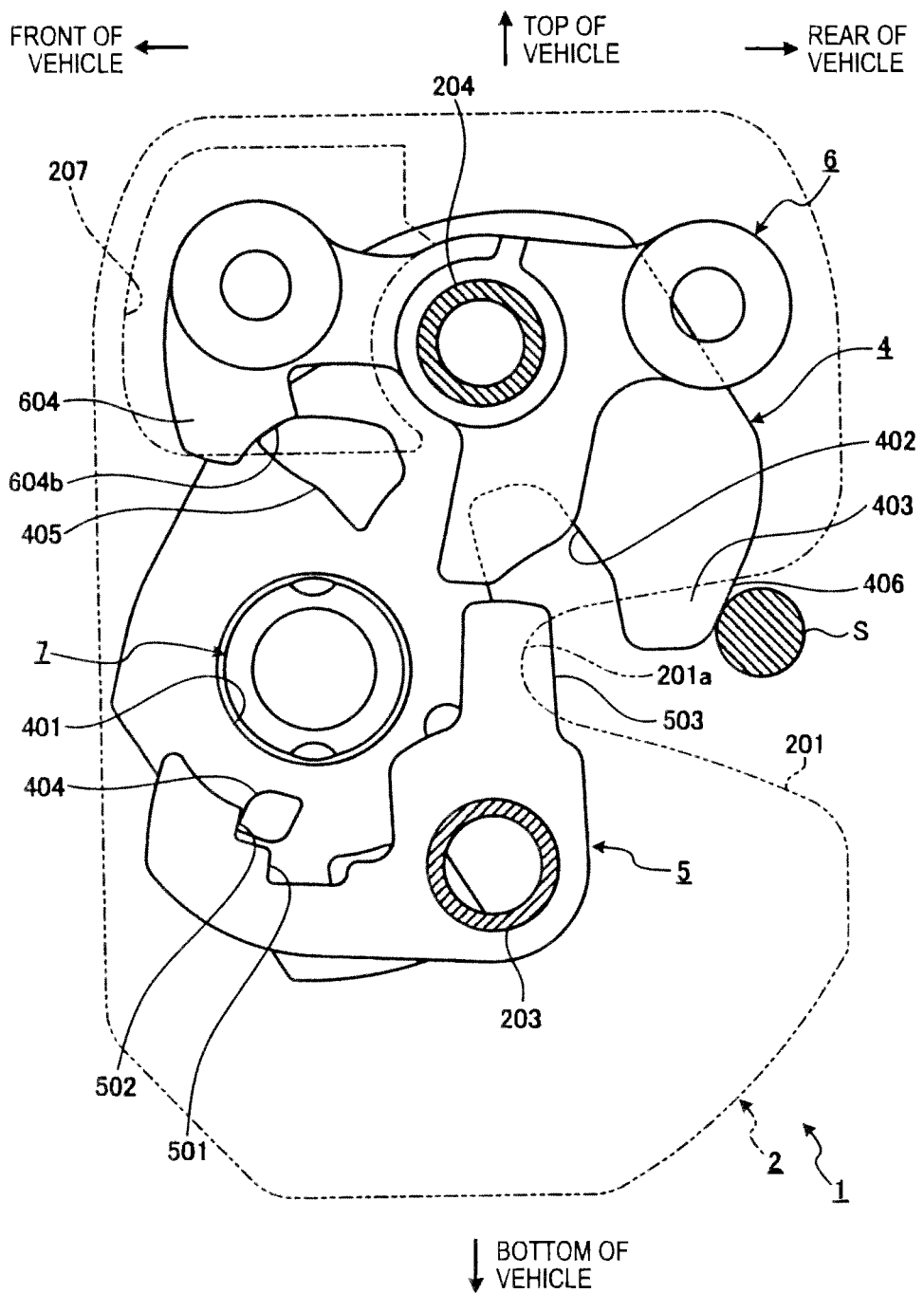
FIG. 8 is an exemplary diagram showing a positional relation between the hook, the guide lever and the opening lever when the hook is held in a halfway position.
Figure 9:
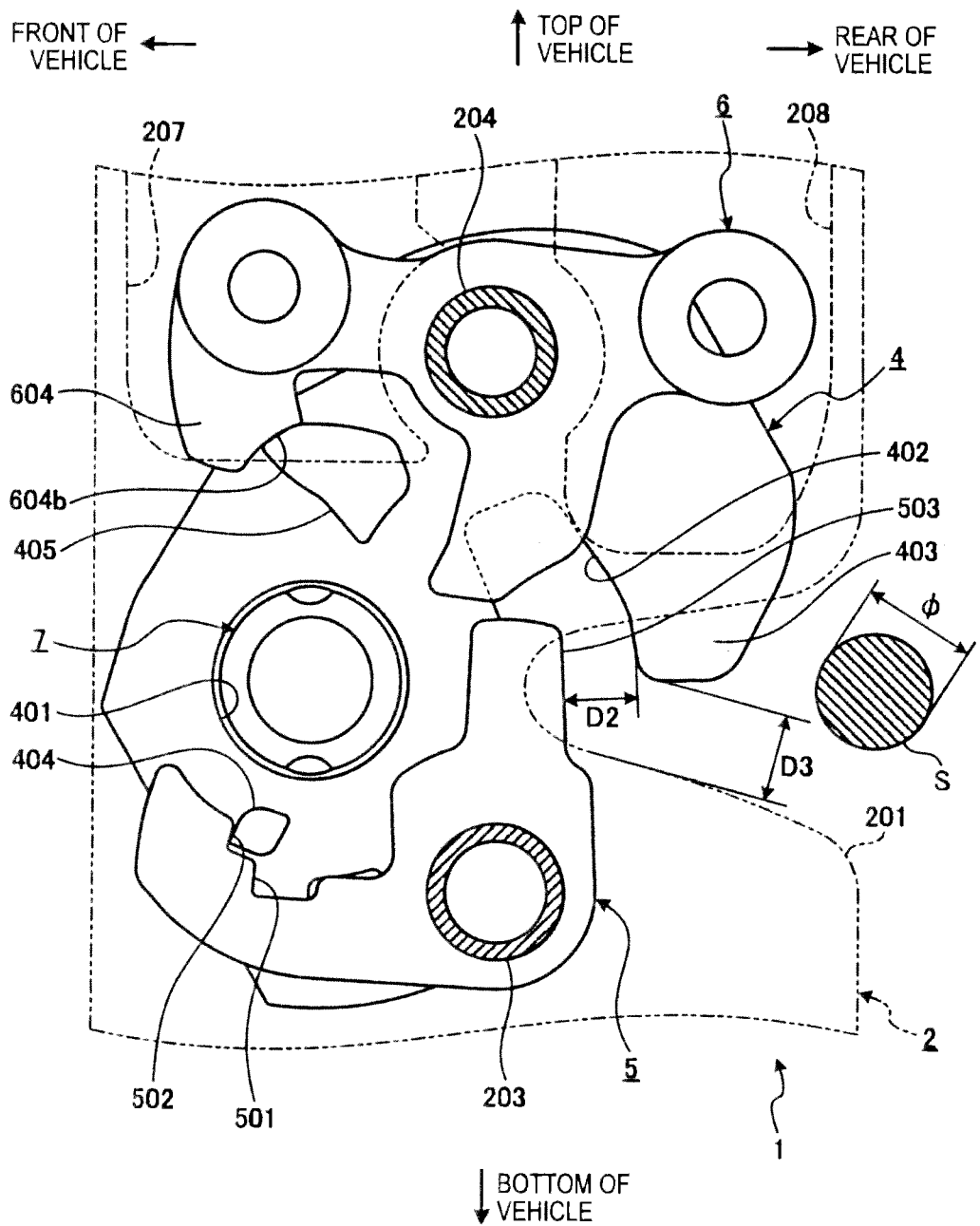
FIG. 9 is an exemplary diagram showing a preferred condition for the halfway position.

FIG. 7 is an exemplary diagram showing a positional relation between the hook, the guide lever and the opening lever at a point in time when the hook has reached the releasing position. FIG. 8 is an exemplary diagram showing a positional relation between the hook, the guide lever and the opening lever when the hook is held in a halfway position. FIG. 9 is an exemplary diagram showing a preferred condition for the halfway position.

In the seat lock apparatus 1 of this exemplary embodiment, the striker S is released before the hook 4 reaches the waiting position. Namely, as shown in FIG. 7, when the hook 4 moves to such an extent that a distance D1 between the hook 4 and the striker entering groove 201 almost coincides with a diameter of the striker S, this means that the hook 4 has reached the releasing position where the striker S can be released, and it becomes possible to allow the striker S to depart from the striker entering groove 201. Therefore, even though the hook 4 is not moved as far as the waiting position, the striker S is allowed to depart from the striker entering groove 201.

However, in the event that the hook 4 is stopped from moving in the striker releasing direction before the hook 4 reaches the waiting position, even though the striker S departs from the striker entering groove 201, causing the guide lever 5 to move in a clockwise direction as seen in FIG. 7, the guide engagement portion 404 is not allowed to be brought into engagement with the waiting hook engagement portion 501. Thus, the hook 4 moves toward the restraining position by means of the biasing force of the coil spring 8. In the seat lock apparatus 1 of this exemplary embodiment, the halfway hook engagement portion 502 is provided to the guide lever 5 in order to prevent the hook 4 from returning to the restraining position in such a state that the striker S departs from the striker entering groove 201, that is, in such a state that the striker S is not in the position where the striker S can be restrained by the hook 4.

As shown in FIG. 8, the halfway hook engagement portion 502 is brought into engagement with the guide engagement portion 404 to thereby hold the hook 4 in a halfway position lying between the releasing position and the restraining position when the hook 4 is in the halfway position and the striker S is not in the position where the striker S can be restrained by the hook 4. On the other hand, as shown in FIG. 7, when the hook 4 is in the releasing position and the striker S is in the position where the striker S can be restrained by the hook 4, the halfway hook engagement portion 502 is in a position where it cannot be brought into engagement with the guide engagement portion 404. Therefore, there is no such situation that the hook 4 is held in the halfway position, whereby the hook 4 is permitted to move to the restraining position.

The guide lever 5 moves in a counterclockwise direction (a disengaging direction) as seen in FIG. 7 when the striker S is restrained and is biased in the clockwise direction by the coil spring 8. Thus, the position of the guide lever 5 when the striker S is not in the position where the striker S can be restrained by the hook 4 is situated further toward the engagement position than the position where the guide lever 5 is held when the striker S is restrained by the hook 4. By setting the dimension of the halfway hook engagement portion 502 based on a difference between both the positions, when the hook 4 is held in the halfway position and the striker S is not in the position where the striker can be restrained by the hook 4, the halfway hook engagement portion 502 is brought into engagement with the guide engagement portion 404 to thereby hold the hook 4 in the halfway position, whereas when the striker S is in the position where the striker S can be restrained by the hook 4, the hook 4 is permitted to move to the restraining position. By this configuration, the hook 4 is prevented from reaching the restraining position in such a state that the striker S is not in the position where the striker S can be restrained by the hook 4. Namely, it is possible to prevent the occurrence of a situation in which the striker S is not restrained irrespective of the fact that the hook 4 is in the restraining position.

In this way, when the hook 4 is held in the halfway position, as shown in FIG. 8, the opening lever 6 should be held in the position where a second engagement portion 604b of the indicator portion 604 is brought into engagement with the indicator engagement portion 405. Namely, the indicator engagement portion 405 is given such a shape that the opening lever 6 is positioned in such a position as to let it known that the hook 4 is not in the restraining position when the indicator engagement portion 405 is brought into engagement with the first engagement portion 604a and the second engagement portion 604b of the indicator portion 604. In this way, by adopting the configuration in which the opening lever 6 is held in the different positions between when the hook 4 is in the restraining position and when the hook 4 is in the other positions than the restraining position, it is possible to detect from the position of the opening lever 6 in an ensured fashion whether or not the seat lock apparatus 1 restrains the striker S.

Incidentally, in the case of holding the hook 4 in the halfway position, as shown in FIG. 8, a distal end portion of the restraining portion 403 of the hook 4 enters the striker entering groove 201. When the striker S enters the striker entering groove 201 in this state, the striker S comes into abutment with the distal end portion of the restraining portion 403. In the seat lock apparatus 1 of this exemplary embodiment, a surface of the restraining portion 403 which is oriented toward an entrance to the striker entering groove 201 is formed into an inclined surface 406. This inclined surface 406 is inclined so that a distance between the entrance of the striker entering groove 201 and itself becomes longer as the inclined surface 406 extends toward the distal end portion of the restraining portion 403 when the hook 4 is held in the halfway position. According thereto, it becomes possible to move the hook 4 in the striker releasing direction by means of a pressing load exerted from the striker S toward the deepest portion 201a of the striker entering groove 201, thereby making it possible to restrain the striker S.

Further, when holding the hook 4 in the halfway position, as shown in FIG. 9, it is preferable that a distance D2 between the hook 4 and the striker abutment portion 503 of the guide lever 5 becomes shorter than the diameter φ of the striker S. Similarly, it is preferable that a distance D3 between the hook 4 and the striker entering groove 201 becomes shorter than the diameter φ of the striker S. According thereto, it is possible to prevent the occurrence of a false restraint in which the striker S enters a gap between the hook 4 and the striker abutment portion 503 when the hook 4 is held in the halfway position. Further, in the state where the hook 4 is held in the halfway position, it is possible for the striker S, when being entered into the striker entering groove 201, to surely abut the restraining portion 403 of the hook 4, so as to move the hook 4 in the striker releasing direction.

Figure 10:
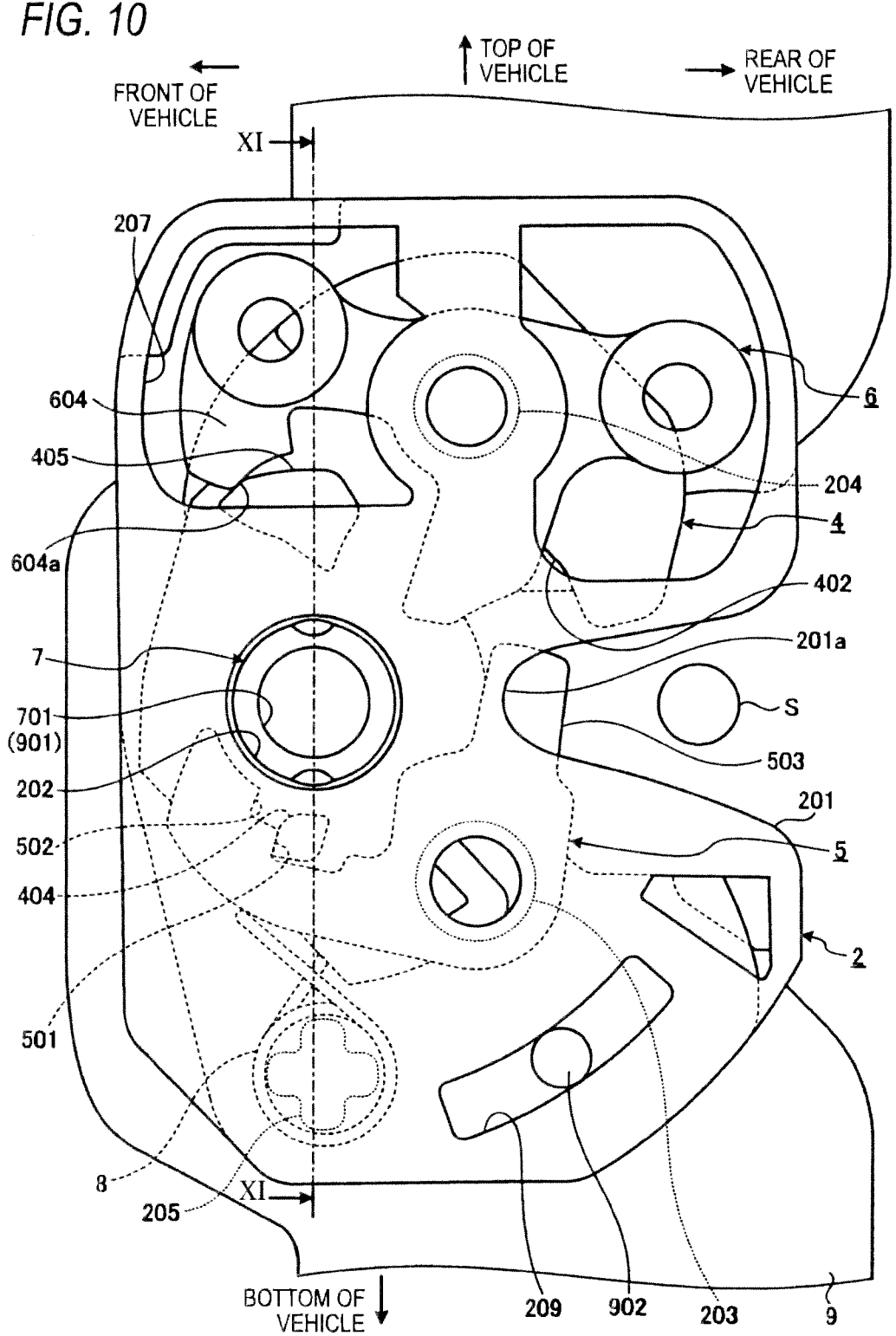
FIG. 10 is an exemplary plan view showing a method for mounting the seat lock apparatus.
Figure 11:
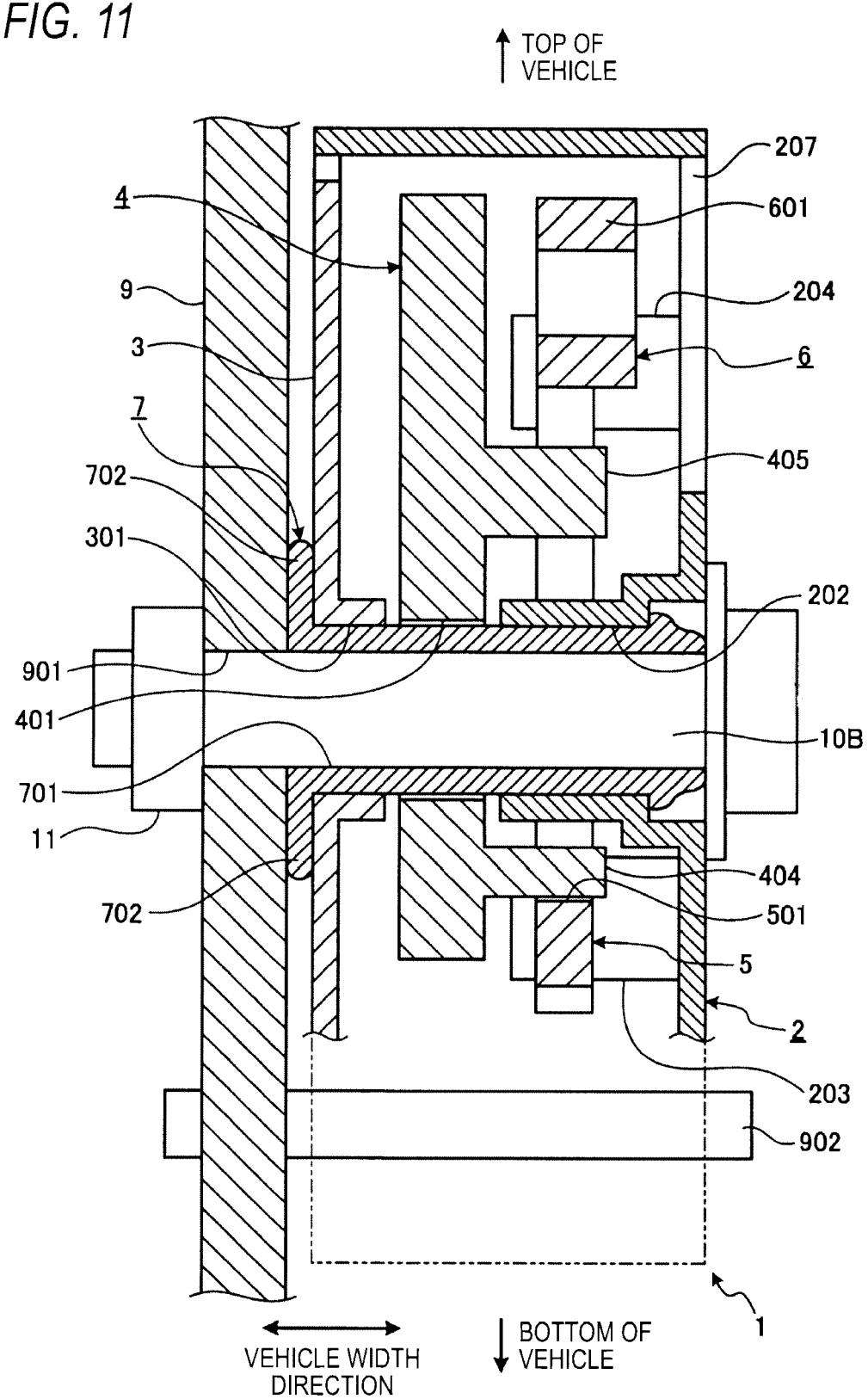
FIG. 11 is a sectional view taken along the line XI-XI in FIG. 10.
Figure 12:
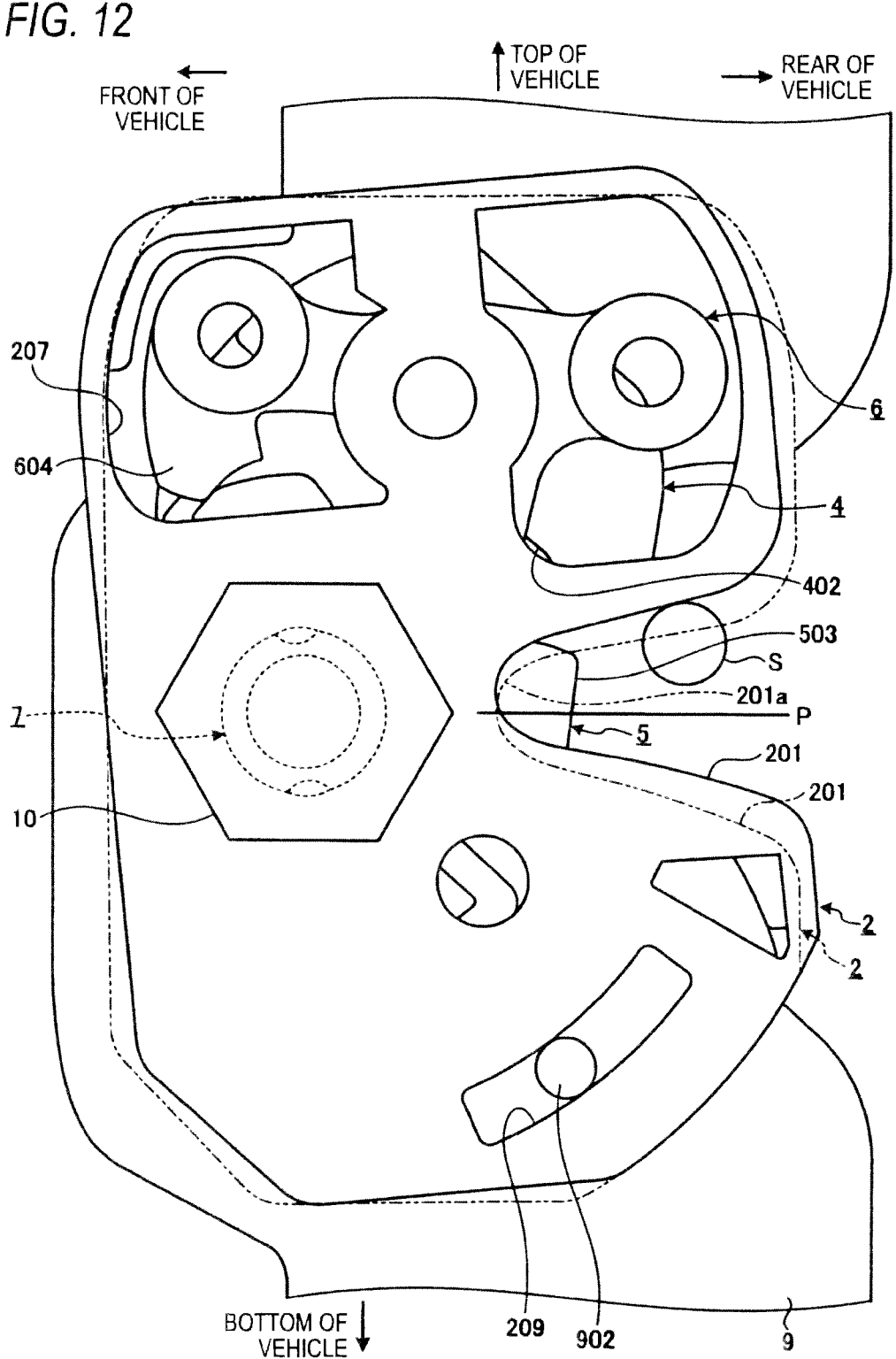
FIG. 12 is an exemplary diagram showing the operation of the seat lock apparatus when a striker entering groove is offset further upwards of a vehicle than a reference entering position.

FIG. 10 is an exemplary plan view showing a method for mounting the seat lock apparatus. FIG. 11 is a sectional view taken along the line XI-XI in FIG. 10. FIG. 12 is an exemplary diagram showing the operation of the seat lock apparatus when a striker entering position is offset further upwards of a vehicle than a reference entering position.

When the seat lock apparatus 1 of this exemplary embodiment is mounted in the backrest of the seat, as shown in FIGS. 10 and 11, the seal lock apparatus 1 is mounted on a frame 9 provided in the backrest by using a bolt 10 and a nut 11. It should be noted that in FIG. 10, the bolt 10 is omitted.

As described above, the hook shaft 7 is passed through the hook shaft insertion hole 202 in the body 2 such that the hook shaft 7 is rotatable. Therefore, as shown in FIG. 11, when a shank 10B of the bolt 10 is passed through the through hole 701 in the hook shaft 7 and a mounting hole 901 in the frame 9 and then the bolt 10 and the nut 11 are fastened, the seat lock apparatus 1 is mounted to the frame 9 so as to be rotatable on the hook shaft 7 as a rotating shaft. In this case, when the seat lock apparatus 1 is mounted in such an orientation that the flange 702 of the hook shaft 7 comes into contact with the frame 9, a gap is produced between the base plate 3 and the frame 9. By virtue of the gap, it is possible to prevent the occurrence of a rotation failure due to friction that would otherwise be produced between the base plate 3 (the seat lock apparatus 1) and the frame 9.

In addition, a rotation restriction rod 902 provided to the frame 9 is passed through a rotation restriction hole 209 in the body 2 and a rotation restriction hole (not shown) in the base plate 3. According thereto, the rotation angle of the seat lock apparatus 1 is restricted.

When the seat lock apparatus 1 is mounted to the frame 9, the mounting position is determined to be such a position that a positional relation between the striker entering groove 201 and the striker S in the top-to-bottom direction of the vehicle becomes a relation shown in FIG. 10. However, due to a tolerance in mounting position of the seal lock apparatus 1 and the striker S, there may be caused a situation in which the position where the striker S enters the striker entering groove 201 deviates in the top-to-bottom direction of the vehicle. In the event that the entrance to the striker entering groove 201 is widened as in the seat lock apparatus 1 of this exemplary embodiment, even though the position where the striker S enters the striker entering groove deviates in the top-to-bottom direction of the vehicle, the striker S is permitted to enter the striker entering groove 201.

In addition, the seat lock apparatus 1 of this exemplary embodiment is mounted to the frame 9 in such a state that the seat lock apparatus 1 can rotate on the hook shaft 7 as the rotating shaft. Thus, in a case where the entering position of the striker S deviates largely upwards toward the top of the vehicle from a reference entering position P as shown in FIG. 12, the seat lock apparatus 1 rotates. In FIG. 12, the position of the body 2 resulting before the striker S enters the striker entering groove 201 is indicated by chain double-dashed lines. When the striker S enters the striker entering groove 201 with the body 2 positioned in the position indicated by the chain double-dashed lines in FIG. 12, the striker S comes into abutment with a side surface of the striker entering groove 201 before the striker S reaches the deepest portion 201a. Since the striker entering groove 201 is narrowed gradually in width as it extends from the entrance toward the deepest portion 201a, when the striker S comes into abutment with part of the striker entering groove 201, the body 2 (the seat lock apparatus 1) rotates in a counterclockwise direction as seen in FIG. 12 by means of a pressing load exerted from the striker S. The opening position of the striker entrance groove 201 is changed as the body 2 rotates so, and therefore, the striker S is allowed to move into the striker entering groove 201 as deep as the deepest portion 201a. Therefore, the striker S is allowed to press on the striker abutment portion 503 of the guide lever 5 and the hook moves to the restraining position, whereby the striker S can be restrained in an ensured fashion. According thereto, it is possible to increase a margin for permitting the striker S to be restrained (a meshing engagement permitting margin).

Further, in the seat lock apparatus 1 of this exemplary embodiment, the rotation restriction rod 902 of the frame 9 is passed through the rotation restriction hole 209 in the body 2 and the rotation restriction hole in the base plate 3. Thus, the rotation of the seat lock apparatus 1 is restricted to an angular range corresponding to a circumferential length of the rotation restriction hole 209. Namely, by adjusting the circumferential length of the rotation restriction hole 209, it is possible to set the rotating range of the seat lock apparatus 1 within the range of the meshing engagement permitting margin. According thereto, it is possible to prevent the occurrence of a situation in which the seat lock apparatus 1 rotates to an angle which exceeds the range of the meshing engagement permitting margin to thereby fail to restrain the striker S. Consequently, with the seat lock apparatus 1 of this exemplary embodiment, the striker S can be restrained in an ensured fashion within the range of the meshing engagement permitting margin.

Thus, according to the seat lock apparatus 1 of this exemplary embodiment, when the striker S is not in the position where the striker S can be restrained by the hook 4, the hook 4 is held in the waiting position or the halfway position, and the hook 4 is held in the restraining position only when the striker S is in the position where the striker S can be restrained by the hook 4. Therefore, it is possible to prevent the hook 4 from moving to the restraining position in such a state that the striker S is not in the position where the striker S can be restrained by the hook 4 without increasing the spring force of the coil spring 8 which biases the hook 4. Namely, with the seat lock apparatus 1 of this exemplary embodiment, the striker S can be released with a light operation force, and it is possible to prevent the occurrence of the situation in which the striker is not restrained irrespective of the fact that the hook 4 is in the restraining position.

In addition, the indicator portion 604 of the opening lever 6 and the indicator engagement portion 405 of the hook 4 are configured so that the opening lever 6 is held in the different positions between when the hook 4 is in the restraining position and when the hook 4 is in the other positions than the restraining position, whereby it is possible to detect from the position of the opening lever 6 whether or not the hook 4 is in the restraining position. Therefore, it is possible to detect whether or not the seat lock apparatus 1 restrains the striker S in an ensured fashion from the position of the opening lever 6.

Further, the halfway hook engagement portion 502 of the guide lever 5 is brought into engagement with the guide engagement portion 404 with the hook 4 being able to move in the striker releasing direction, and the inclined surface 406 is provided to the distal end portion of the restraining portion 403, whereby it is possible to restrain the striker S which enters the striker entering groove 201 in an ensured fashion even when the hook 4 is held in the halfway position.

Further, the hook 4 is rotatably supported by the hook shaft 7, and the guide engagement portion 404 is provided to the one side of the hook shaft 7, while the indicator engagement portion 405 is provided to the other side of the hook shaft 7. Therefore, it is possible to dispose the guide lever 5 which is in engagement with the guide engagement portion 404 and the opening lever 6 which is in engagement with the indicator engagement portion 405 so as not to be superposed on one on the top of the other, thereby making it possible to suppress the increase in thickness of the seat lock apparatus 1.

Moreover, the hook shaft 7 is provided to the body 2 such that the hook shaft 7 is rotatable, and the seat lock apparatus 1 can be mounted to the frame 9 so that the seat lock apparatus 1 can rotate on the hook shaft 7 as the rotating shaft. Therefore, even though the entering position of the striker S to the striker entering groove 201 deviates, it is possible to restrain the striker S in an ensured fashion.

Thus, while the exemplary embodiment of the seat lock apparatus 1 according to the invention has been described, the invention is not limited to the configuration of the exemplary embodiment and can, of course, be modified as required without departing from the spirit and scope of the invention.

For example, the hook shaft which supports the hook 4 such that the hook 4 is rotatable may be integrally provided to the body 2. In addition, the seat lock apparatus 1 may be mounted to the frame 9 so as not to rotate relative thereto. As this occurs, the rotation restriction hole 209 in the body 2 and the rotation restriction rod 902 in the frame 9 may be omitted.

In addition, in place of providing the halfway hook engagement portion 502 to the guide lever 5, an engagement portion may be provided to the hook 4 which is brought into engagement with the waiting hook engagement portion 501 in the halfway position. Further, the hook 4, the guide lever 5 and the opening lever 6 may be supported so that they move in a rectilinear fashion to change their positions.

What is claimed is:
1. A seat lock apparatus comprising:
    a body having a striker entering groove configured to receive a striker;
    a hook that is supported by the body so as to be movable from a restraining position, in which the hook is brought into engagement with the striker having been entered in the striker entering groove to restrain the striker, in a striker releasing direction for releasing the striker, wherein the hook is biased in a direction opposite to the striker releasing direction by a spring; and
    a guide lever that is supported by the body so as to be movable from an engagement position, in which the guide lever is brought into engagement with the hook having been moved in the striker releasing direction to hold the position of the hook, in a disengaging direction for being disengaged from the hook, wherein the guide lever is biased in a direction opposite to the disengaging direction by the spring,
    wherein the guide lever comprises:
        a hook engagement portion configured to be brought into engagement with a guide engagement portion provided to the hook; and
        a striker abutment portion configured to be brought into abutment with the striker,
    wherein the hook and the guide lever are configured such that:
        when the hook reaches a waiting position which lies further in the striker releasing direction than a releasing position for allowing the striker to be released, the guide lever moves to an engagement position, in which the guide engagement portion of the hook and the hook engagement portion of the guide lever are brought into engagement with each other so as to hold the hook in the waiting position; and
        when the striker abutment portion of the guide lever is pressed by the striker, the guide lever moves in the disengaging direction to cancel the engagement of the guide engagement portion of the hook with the hook engagement portion of the guide lever so as to enable the hook to restrain the striker and to make the guide lever to be held at a position where the guide lever reaches after the guide lever has moved in the disengaging direction, and
    wherein the guide lever comprises a halfway hook engagement portion configured to, when the hook is in a halfway position lying between the releasing position and the restraining position and the striker is not in a position where the striker can be restrained by the hook, bring into engagement with the guide engagement portion of the hook so as to hold the hook in the halfway position.
2. The seat lock apparatus according to claim 1,
    wherein the halfway hook engagement portion of the guide lever is configured to be brought into engagement with the guide engagement portion of the hook in such a way as to permit the movement of the hook in the striker releasing direction.
3. The seat lock apparatus according to claim 1,
    wherein when the hook is held in the halfway position, a distance between the hook and the striker abutment portion of the guide lever is shorter than a diameter of the striker.
4. The seat lock apparatus according to claim 1,
    wherein the hook comprises a restraining portion which moves across the striker entering groove between the striker and an entrance to the striker entering groove and is configured to restrain the striker, and
    wherein the restraining portion comprises an inclined surface on a surface facing the entrance to the striker entering groove, the inclined surface being inclined such that a distance from the entrance to the striker entering groove when the hook is held in the halfway position becomes longer as the inclined surface extends toward a distal end portion thereof.
5. The seat lock apparatus according to claim 1,
    wherein the hook is rotatably supported by a hook shaft provided in the body, wherein the hook shaft is provided to the body such that the hook shaft is rotatable, and wherein the body is rotatably supported by a support member in such a way that an opening position of the striker entering groove is changed via the hook shaft.

6. The seat lock apparatus according to claim 1, further comprising:

an opening lever that is supported in the body in such a way as to move the hook in the striker releasing direction, wherein the opening lever is biased by a spring in a direction opposite to the direction in which the hook is moved in the striker releasing direction, wherein the hook is rotatably supported by a hook shaft provided in the body, wherein the hook comprises:

the guide engagement portion at a first side of the hook shaft; and an indicator engagement portion at a second side of the hook shaft, the indicator engagement portion being configured to be brought into engagement with the opening lever to hold the position of the opening lever to the second side of the hook shaft, and wherein the opening lever comprises:

a canceling portion configured to press on the indicator engagement portion of the hook to move the hook in the striker releasing direction; and an indicator portion configured to be brought into engagement with the indicator engagement portion of the hook when being moved in a biased direction.

7. The seat lock apparatus according to claim 6, wherein the indicator portion of the opening lever and the indicator engagement portion of the hook are configured such that a position where the opening lever is held when the hook is in the restraining position differs from a position where the opening lever is held when the hook is in a position other than the restraining position.

8. The seat lock apparatus according to claim 6, wherein the hook shaft is provided to the body such that the hook shaft is rotatable, and wherein the body is rotatably supported by a support member in such a way that an opening position of the striker entering groove is changed via the hook shaft.

* * * * *